United States Patent
Cecchi et al.

(10) Patent No.: US 9,985,916 B2
(45) Date of Patent: *May 29, 2018

(54) MODERATING ONLINE DISCUSSION USING GRAPHICAL TEXT ANALYSIS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/636,480

(22) Filed: Mar. 3, 2015

(65) Prior Publication Data

US 2016/0261530 A1   Sep. 8, 2016

(51) Int. Cl.
*G06F 15/16* (2006.01)
*H04L 12/58* (2006.01)
(Continued)

(52) U.S. Cl.
CPC ............ *H04L 51/12* (2013.01); *G06F 17/243* (2013.01); *G06F 17/2785* (2013.01);
(Continued)

(58) Field of Classification Search
CPC ....... H04L 51/12; H04L 51/16; H04L 43/045; H04L 41/22; G06Q 50/00;
(Continued)

(56) References Cited

U.S. PATENT DOCUMENTS 7,881,924 B2 * 2/2011 Shaw ................. G06F 17/2765
704/251
8,301,475 B2 10/2012 Bean et al.
(Continued)

FOREIGN PATENT DOCUMENTS

WO   2012162044 A1   11/2012

OTHER PUBLICATIONS

Guillermo A. Cecchi, et al.,"Moderating Online Discussion Using Graphical Text Analysis," U.S. Appl. No. 14/742,838, filed Jun. 18, 2015.
(Continued)

*Primary Examiner* — Hamza N Algibhah
*Assistant Examiner* — Anh Nguyen
(74) *Attorney, Agent, or Firm* — Cantor Colburn LLP; Yeen Tham

(57) ABSTRACT

Embodiments relate to moderating an online discussion. A method for moderating an online discussion between a plurality of participants is provided. The method receives expressions from a participant during an online discussion. The method generates a graph of expressions of the participant. The method performs a graphical text analysis on the graph to determine a likelihood of the participant to have a problematic behavior. The method performs a moderating action responsive to the likelihood exceeding a threshold likelihood.

16 Claims, 6 Drawing Sheets

(51) Int. Cl.
 G06F 17/24 (2006.01)
 G06F 17/27 (2006.01)
 G06F 17/30 (2006.01)
 G06Q 10/10 (2012.01)
 G06Q 50/00 (2012.01)
(52) U.S. Cl.
 CPC .. G06F 17/30684 (2013.01); G06F 17/30702 (2013.01); G06Q 10/10 (2013.01); G06Q 50/01 (2013.01); H04L 51/16 (2013.01)
(58) Field of Classification Search
 CPC ......... G06F 17/30684; G06F 17/30702; G06F 17/2785; G06F 17/243
 See application file for complete search history.

(56) References Cited

U.S. PATENT DOCUMENTS

| | | | |
|---|---|---|---|
| 8,412,645 B2 | 4/2013 | Ramaswamy et al. | |
| 8,490,199 B2 | 7/2013 | Zalewski | |
| 8,561,184 B1* | 10/2013 | Marsa | H04L 67/22 726/22 |
| 8,719,302 B2* | 5/2014 | Bailey | G06F 17/30705 707/607 |
| 2004/0111479 A1 | 6/2004 | Borden et al. | |
| 2011/0257976 A1* | 10/2011 | Huo | G10L 15/02 704/256.1 |
| 2013/0096892 A1 | 4/2013 | Essa et al. | |
| 2013/0138735 A1 | 5/2013 | Kanter et al. | |
| 2013/0179440 A1 | 7/2013 | Gordon | |
| 2014/0156360 A1* | 6/2014 | Shalita | G06Q 30/0255 705/14.1 |
| 2014/0156996 A1 | 6/2014 | Heppe et al. | |
| 2016/0189038 A1* | 6/2016 | Sanjay | G06N 5/04 706/55 |

OTHER PUBLICATIONS

List of IBM Patents or Patent Applications Treated as Related; Date File: Mar. 3, 2015, pp. 1-2.

Andrew Amt et al.; "Learning to Perform Moderation in Online Forums"; Department of Computer Science, University of Massachusetts, Amherst, MA 01003; Proceedings of the IEEE/WIC Internation Conference on Web Intelligence (WI 2003); 5 pages.

Bo Pang et al.; "Opinion Mining and Sentiment Analysis"; Foundations and Trends in Information Retrieval, vol. 2, Nos. 1-2 (2008); pp. 1-135.

Nayer Wanas et al.; "Automatic Scoring of Online Discussion Posts"; Proceedings of the 2nd ACM Workshop on Information Credibility on the Web; ACM; 2008; pp. 19-25.

* cited by examiner

MODERATING ONLINE DISCUSSION USING GRAPHICAL TEXT ANALYSIS

BACKGROUND

The present invention relates generally to moderating an online discussion, and more specifically, to moderating an online discussion based on a graphical text analysis of the expressions made by the discussion participants.

Online discussions take place in online discussion forums, where people hold discussions in the form of posted messages. An online discussion may become unproductive, when "trolls" are about to take charge, when the social dynamics begin to indicate lack of productivity, or when the social dynamics begin to indicate a dysfunctional discussion and a degree of risk, possible retribution, or lawsuit. For some online discussion forums, human monitors disable comments when a discussion becomes unproductive, insulting, tending toward danger, or tending toward bullying or exhibiting threatening dynamics.

SUMMARY

Embodiments include a computer program product, a method, and a system for moderating an online discussion between a plurality of participants. According to an embodiment of the present invention, a computer program product is provided. The computer program product comprises a computer readable storage medium having program instructions embodied therewith. The program instructions readable by a processing circuit cause the processing circuit to perform a method of moderating an online discussion between a plurality of participants. The method receives expressions from a participant during an online discussion. The method generates a graph of expressions of the participant. The method performs a graphical text analysis on the graph to determine a likelihood of the participant to have a problematic behavior. The method performs a moderating action responsive to the likelihood exceeding a threshold likelihood.

According to another embodiment of the present invention, a method for moderating an online discussion between a plurality of participants is provided. The method receives expressions from a participant during an online discussion. The method generates a graph of expressions of the participant. The method performs a graphical text analysis on the graph to determine a likelihood of the participant to have a problematic behavior. The method performs a moderating action responsive to the likelihood exceeding a threshold likelihood.

According to a further embodiment of the present invention, a computer system for moderating an online discussion between a plurality of participants is provided. The computer system comprises a memory having computer readable instructions and a processor configured to execute the computer readable instructions. The instructions comprise receiving expressions from a participant during an online discussion. The instructions further comprise generating a graph of expressions of the participant. The instructions further comprise performing a graphical text analysis on the graph to determine a likelihood of the participant to have a problematic behavior. The instructions further comprise performing a moderating action responsive to the likelihood exceeding a threshold likelihood.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of the invention provide systems and methods that perform a graphical text analysis on the expressions that discussion participants make in an online discussion, in order to estimate the behavior of a participant that may lead to a problem. More specifically, the systems and methods generate a graph of the expressions and compare the generated graph with different clusters of previously generated graphs that each represent a different behavior that led to one or more problems in an online discussion. The systems and methods trigger one or more moderating actions if the likelihood of the participant to have the determined behavior exceeds a threshold likelihood.

An online discussion, as used in this disclosure, refers to a synchronous or asynchronous exchange of textual expressions between two or more participants. Examples of an online discussion include a sequence of comments or posted messages (i.e., "threads") in an on-line bulletin board, a sequence of comments under a post in a social network, a sequence of comments under an online article, a sequence of group emails, a live conversation in an online chat room or in an online game, and the like.

Figure 1:
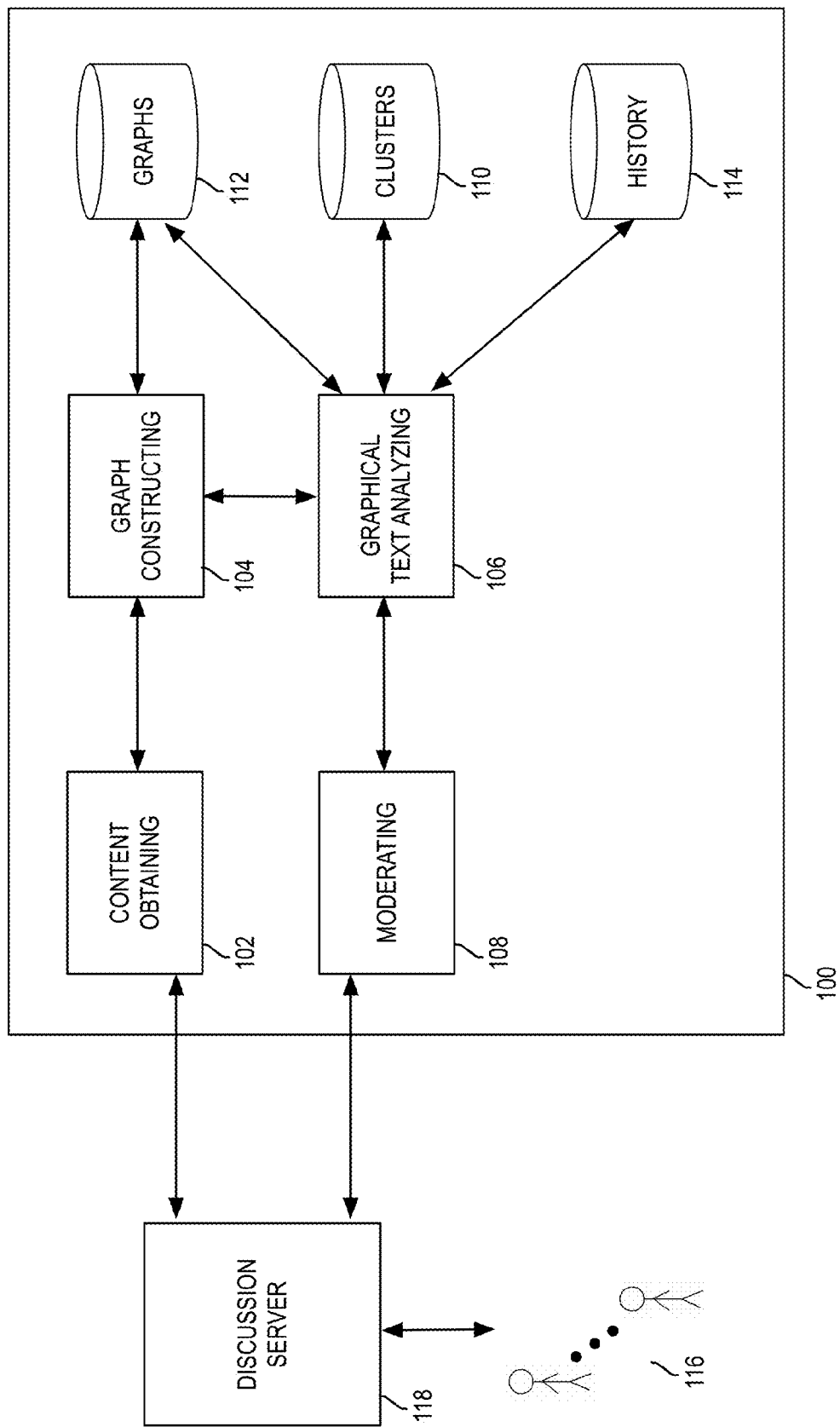
FIG. 1 depicts a system for moderating an online discussion according to an embodiment of the present invention.

FIG. 1 illustrates a system 100 for moderating an online discussion. In some embodiments, the system 100 includes modules, sub-modules and datastores such as a content obtaining module 102, a graph constructing module 104, a graphical text analyzing module 106, a moderating module 108, a clusters repository 110, a graphs repository 112, and a behavior history repository 114. FIG. 1 also illustrates participants 116 and a discussion server 118.

The participants 116 are the participants of an online discussion that is carried out via the discussion server 118. The participants 116 use computing devices (e.g., smartphones, tablets, laptops, etc.) to access the discussion server 118. The computing devices may run one or more communication tools (e.g., a web browser, a game application, a chatting software tool, an email client, etc.) that allow the participants to post messages to participate in the discussion. These computing devices are connected to the discussion server 118 over one or more networks (not shown).

The discussion server 118 provides an online forum for the participant to share and exchange expressions during the online discussion. For instance, the discussion server 118 implements a bulletin board system, a web server, a game server, an email server, a social network service, and/or an online chat server.

In some embodiments, the discussion server 118 pushes content of the discussion to the system 100, or the discussion server 118 may allow the system 100 to retrieve the content of the discussion from the discussion server 118. In some embodiments, the discussion server 118 is remotely connected to the system 100 via one or more networks (e.g., Internet). In other embodiments, the server 118 is part of the system 100.

The content obtaining module 102 obtains the content of the online discussion by receiving or retrieving the content from the discussion server 118. The content of the online discussion includes expressions (e.g., textual expressions such as words and symbols, audiovisual expressions such as emoticons, images, audio clips, and video clips, etc.) that are exchanged or shared by the participants during the discussion. The content of the online discussion obtained by the content obtaining module 102 may also include metadata (e.g., an address or an identifier of the server 118, identifiers of the participants, an identifier of the discussion, attributes (transcripts, descriptions, file names, etc.) of the audio and video clips, etc.) associated with the expressions.

The graph constructing module 104 receives the text of the participants' expressions and the associated metadata from the content obtaining module 102. The graph constructing module 104 then builds a graph from the received data for the participants 116. More specifically, in some embodiments, the graph constructing module 104 extracts syntactic features from the received text and converts the extracted features to vectors. These syntactic vectors may have binary components for the syntactic categories such as verb, noun, pronoun, adjective, lexical root, etc. For instance, a vector [0, 1, 0, 0 . . . ] represents a noun-word in some embodiments.

The graph constructing module 104 may also generate semantic vectors from the received text using one or more now known or later developed techniques (e.g., Latent Semantic Analysis and WordNet). The semantic content of each expression in the text may be represented by a vector, of which the components are determined by Singular Value Decomposition of word co-occurrence frequencies over a large database of documents.

A graph generated by the graph constructing module 104 may be in the form of: G={N, E, W̌}, where the nodes N represent tokens (e.g., words or phrases), the edges E represent temporal precedence in the participant' expressions, and each node possesses a feature vector W̌ defined in some embodiments as a direct sum of the syntactic and semantic vectors and additional non-textual feature vector (e.g., a predetermined vector for the identity of a participant). That is, in some embodiments, the feature vector W̌ is defined by the equation: $W̌ = w̌_{sym} \oplus w̌_{sem} \oplus w̌_{ntxt}$, where W̌ is the feature vector, $w̌_{sym}$ is the syntactic vector, $w̌_{sem}$ is the semantic vector, and $w̌_{ntxt}$ is the non-textual features.

Figure 2:
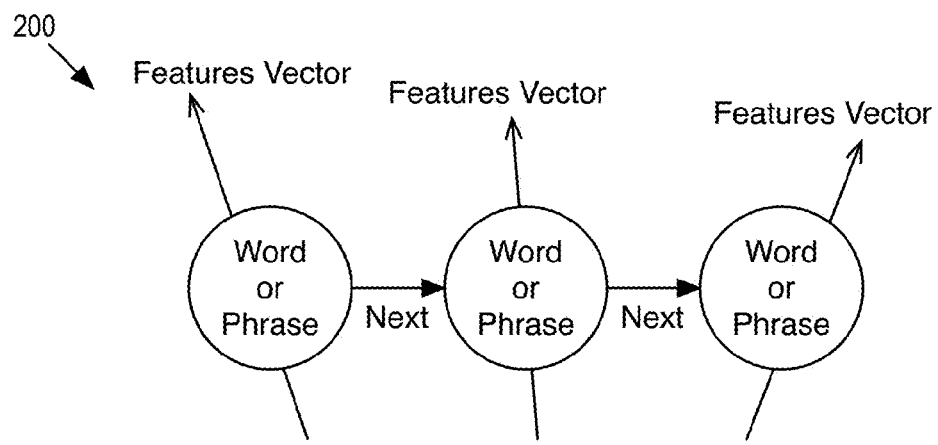
FIG. 2 depicts a graph of expressions according to an embodiment of the invention.

An example graph 200 that may be generated by the graph constructing module 104 is shown in FIG. 2. As shown, the graph 200 is a directed graph that includes an ordered set of expressions (e.g., words or phrases), each with a feature vector. Loops may form in this graph if the same expressions are made more than once. In some embodiments, the graph constructing module 104 builds one graph that includes expressions of all participants. Alternatively or conjunctively, the graph constructing module 104 builds one graph for each participant that includes only the expressions of the participant.

Figure 3:
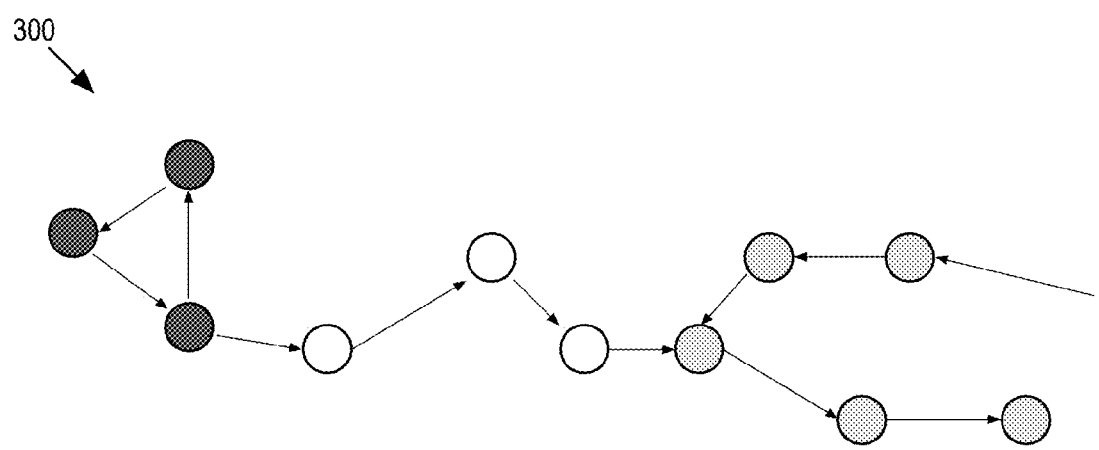
FIG. 3 depicts a graph of expressions according to an embodiment of the invention.

FIG. 3 illustrates a graph 300 for a group of participants (e.g., three participants depicted as black, grey and white nodes). The graph 300 may be built for all participants or constructed by combining graphs for individual participants. In some embodiments, the nodes of the graph 300 may be associated with identities of the participants. For instance, the nodes of the graph may be assigned to the words or phrases spoken by a participant as well as to the participant. The nodes of the graph may have meta-data that specify the identities of the participants. These identities of the participants may be used by the moderating module 108 (described further below) for dialogue and discussion analysis to identify which participant is having problematic behaviors or causing unproductive exchanges. In other embodiments, the nodes of the graph 300 may remain anonymous (i.e., not associated with identities of the participants).

Referring back to FIG. 1, the graph constructing module 104 updates the graphs as more text from the discussion is received from the content obtaining module 102 as the discussion continues. The graph constructing module 104 stores the generated graphs for the participants in the graphs repository 112.

The graphical text analyzing module 106 performs a graphical text analysis on the graph generated by the graph constructing module 104. As a specific example of a graphical text analysis, in some embodiments, the graphical text analyzing module 106 analyzes the graph G for the participant generated by the graph construction module 104 based on a variety of topological features. The variety of features include graph-theoretical topological measures of the graph skeleton (i.e., a graph without features vectors: $G_{Sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\Sigma_n E_{nm} W̌_n \dagger W̌_m$) such that temporal proximity (e.g., number of edges between two nodes) and feature similarity are taken into account. These features, which incorporate the syntactic, semantic and dynamical components of the expressions, are then combined as a multi-dimensional features vector F̌ that represents a sample. This feature vector is finally used to train a standard classifier: $M=M(F̌_{train}, C_{train})$, to discriminate the samples that belong to different conditions C, such that for each sample the classifier estimates its condition identity based on the extracted features: $C(sample)=M(F̌_{sample})$.

The clusters repository 110 stores different clusters of graphs that represent different behaviors of participants that previously led to one or more different problems in discussions. Examples of problems in the discussions include dominance, unproductiveness, inappropriateness, insulting, bullying, threatening dynamics, breaking social dynamics, dysfunction, cheating in online games, and the like. In some embodiments, the graphs and clusters are prepared based on previous online discussions and problems occurred during the discussions. The clusters of graphs are also associated with remedial or moderating actions taken or recommended for the course of the discussions or alleviate the problems.

The graphical text analyzing module 106 compares the graph for all participants or the graph for each participant with the clusters of previously generated graphs stored in the clusters repository 110 in order to determine a behavior of the participant. Specifically, the feature vectors of previously generated graphs are plotted in a multi-dimensional text feature space to form clusters in that space. The graphical text analyzing module 106 plots the feature vectors of the graph for the participant in the space in order to determine whether the graph belongs to a cluster based on, e.g., distance between the plots of the graph and the plots of the clusters. If the plots of the graph fall in the feature space of a particular cluster, the corresponding discussion state represented by the cluster is determined as the behavior of the participant.

Figure 6:
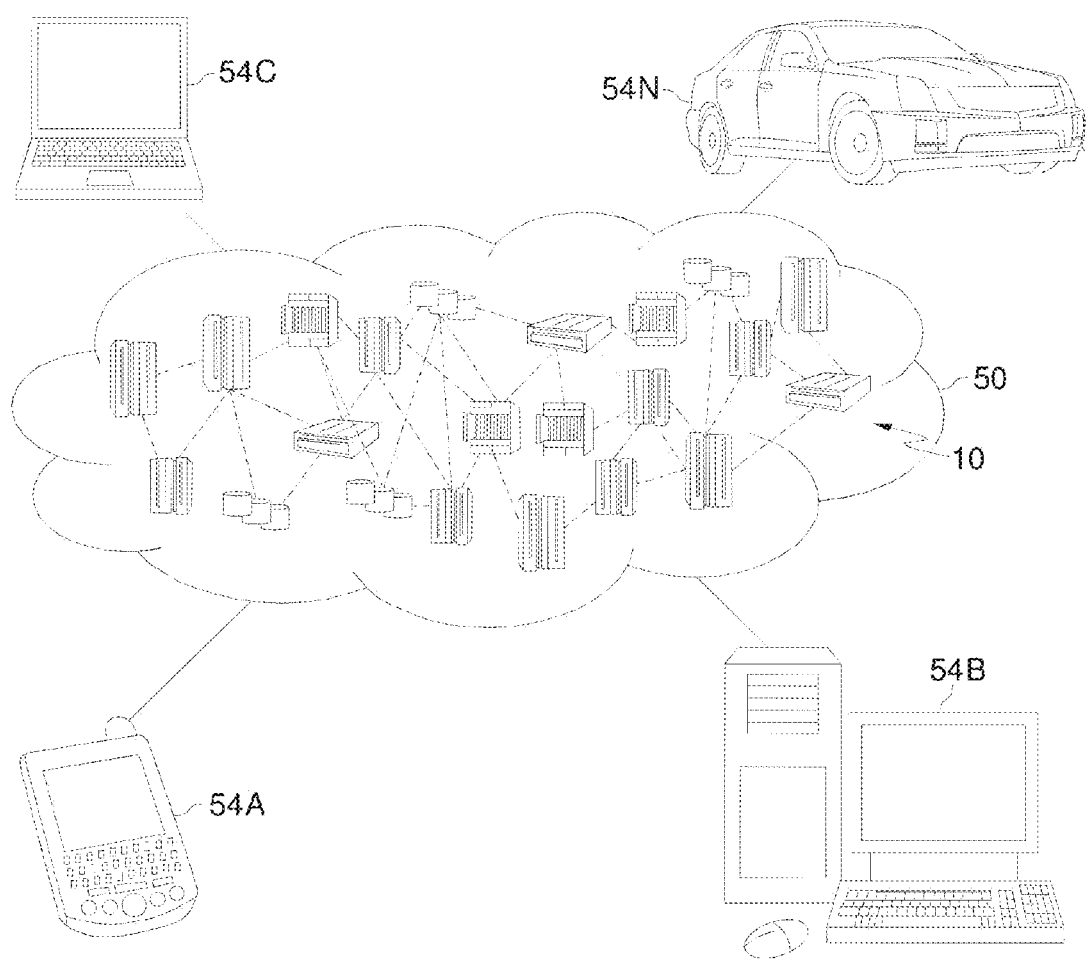
FIG. 6 depicts a cloud computing environment according to an embodiment of the present invention.

In some embodiments, the graphical text analyzing module 106 also determines for each cluster a likelihood of the graph to belong to the cluster (i.e., the level of correlation between the graph and the cluster). In some embodiments, the graphical text analyzing module 106 may select a group of participants in the discussion who exhibit camaraderie or relationship in the discussion. The graphical text analyzing module 106 combines the analyses of the graphs for the selected participants to boost the likelihood of the graphs to belong to a particular cluster of graphs. FIG. 6 illustrates an example graph 300 for a graph of three participants. As described above, the nodes for different participants may include information about the identities of the participants. Specifically, the nodes for a participant are depicted in black, the nodes for another participant are depicted in white, and the nodes for yet another participant are depicted in grey. In some embodiments, the graphical text analyzing module 106 may discard or anonymize the graphs of the words stored in the graphs repository 112 for reasons of privacy, after graphical text analysis is performed on those graphs.

The moderating module 108 generates one or more moderating actions to change the course of discussion or alleviate the problems associated with the determined behavior of a participant if the likelihood of the graph for the participant to belong to a cluster representing the determined behavior exceeds a threshold likelihood. In some embodiments, the threshold likelihood is calibratable by, e.g., an administrator or user of the system 100.

In some embodiments, the moderating actions include sending an alert message to a human moderator that monitors the discussion so that the human moderator may take appropriate actions upon receiving the alert message. Alternatively or conjunctively, the moderating module 108 automatically takes actions to change the course of the discussion or alleviate the problems. For instance, the moderating module 108 may send a warning message to the participant or limit the participant's ability to post messages via the server 118. As such, the functioning of the system 100, which may be implemented in a computer system (e.g., computer system 12 described further below with reference to FIG. 5), may be improved.

The graphical text analyzing module 106 stores a history of the determined behaviors in the behavior history repository 114. In some embodiments, the moderating module 108 stores in the behavior history repository 114 a history of moderating actions taken along with the history of the determined behaviors. The graphical text analyzing module 106 and the moderating module 108 may use the histories stored in the repository 114 to improve accuracy of the behavior determination and to implement more useful moderating actions.

Figure 4:
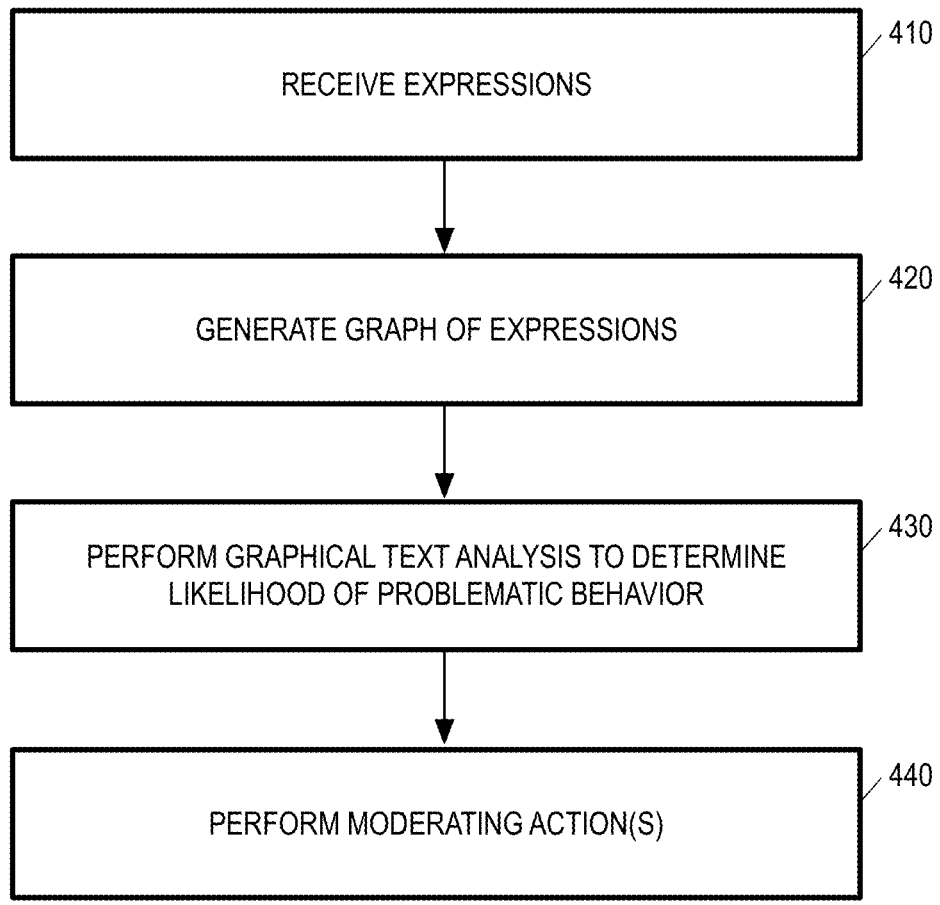
FIG. 4 depicts a process flow for moderating an online discussion according to an embodiment of the present invention.

FIG. 4 illustrates a process flow for moderating an online discussion between a plurality of participants. In some embodiments, the system 100 performs the process flow shown in FIG. 4. At block 410, the system 100 receives expressions from the participant during an online discussion. An online discussion includes one of a sequence of comments or posted messages in an online bulletin board, a sequence of comments under a post in a social network, a sequence of comments under an online article, a sequence of group emails, a live conversation in an online chat room or in an online video game, and text in systems that allow a participant to upload and download. At block 420, the system 100 generates a graph of expressions of the participant.

At block 430, the system 100 performs a graphical text analysis on the graph to determine a likelihood of a participant to have a problematic behavior. More specifically, in some embodiments, the system determines a likelihood of the graph to belong to one of a plurality of clusters of previously generated graphs. Each cluster represents one or more different problematic behaviors. A problematic behavior represented by a cluster previously caused a problem in an online discussion. In some embodiments, the system 100 combines the graph with another graph for another participant and performs a graphical text analysis on the combined graph to increase the likelihood. In some embodiments, the system 100 generates at least one more graph of expressions of at least one more participant and combines the graphs into a single graph. The system 100 then performs a graphical text analysis on the combined graph in order to identify which one or more of the participants have a problematic behavior.

At block 440, the system 100 performs a moderating action responsive to the likelihood exceeding a threshold likelihood. Specifically, in some embodiments, the system 100 sends a message to a human moderator of the discussion in order to cause the human moderator to take an appropriate action to influence a course of the discussion and/or alleviate problems. Alternatively or conjunctively, the system 100 sends a message to the participant or limiting the participant's ability to participate in the discussion.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
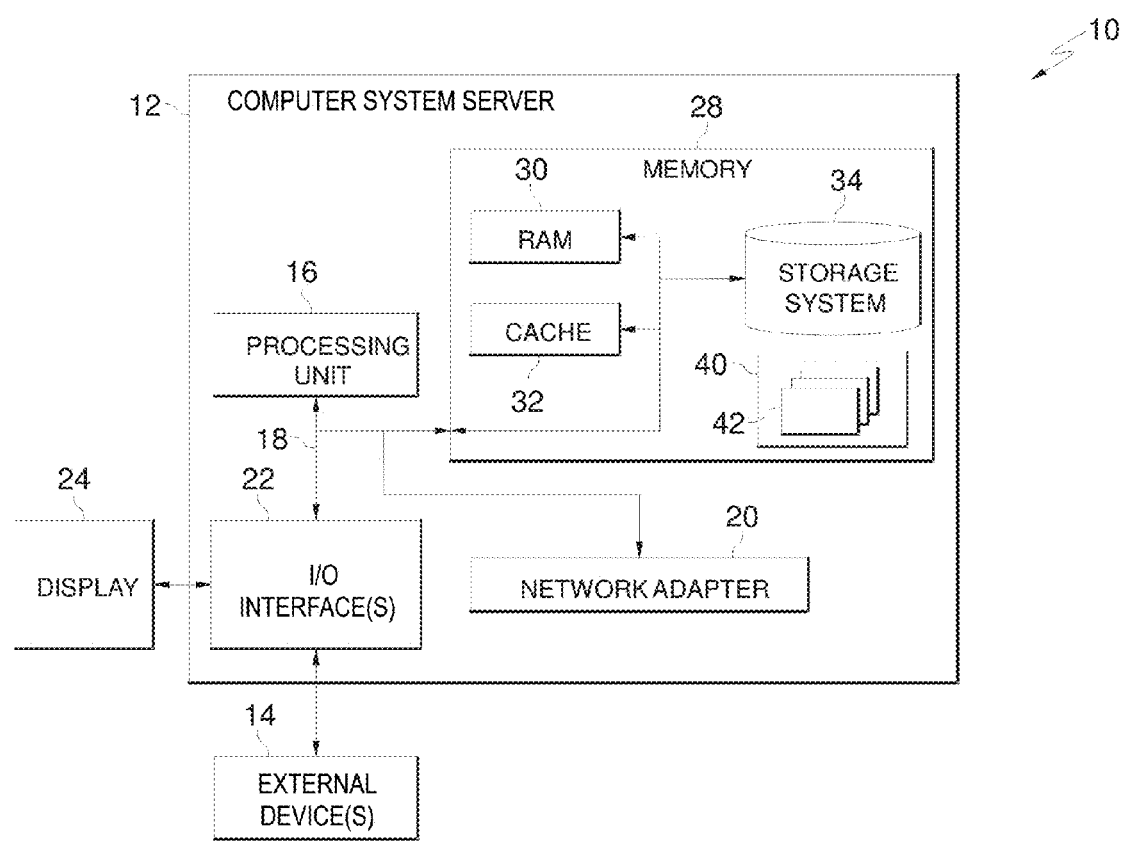
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
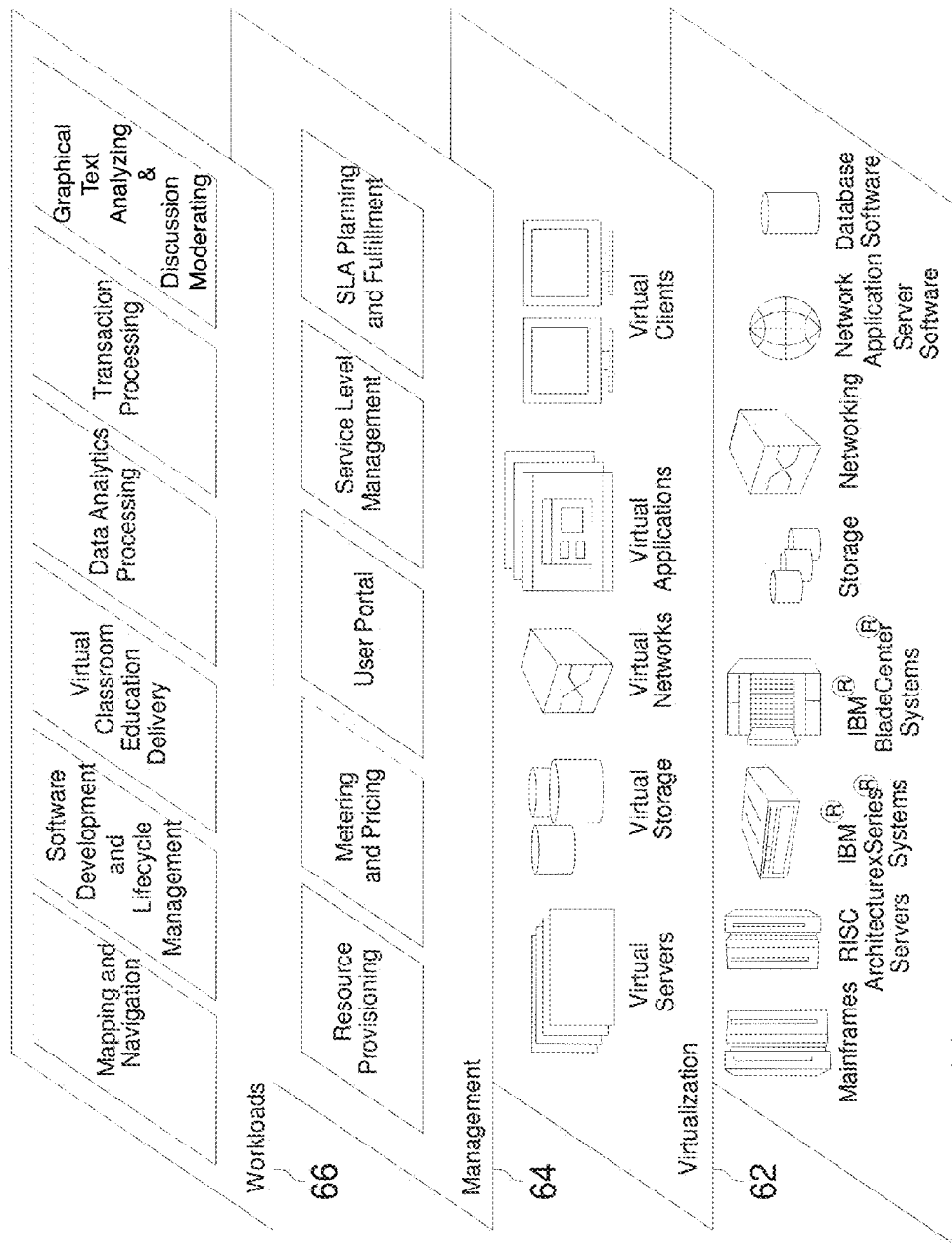
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and graphical text analyzing and discussion moderating.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, comprising:
a computer readable storage medium having program instructions embodied therewith, the program instructions readable by a processing circuit to cause the processing circuit to perform a method of moderating an online discussion between a plurality of participants, the method comprising:
receiving expressions from a participant during an online discussion;
generating a graph of expressions of the participant, wherein the graph comprises nodes that represent tokens, and edges that represent temporal precedence in the expressions, wherein each node possesses a feature vector, and wherein the feature vector is a direct sum of a syntactic vector, a semantic vector, and a predetermined vector for an identity of the participant;
performing a graphical text analysis on the graph to determine a likelihood of the participant to have a problematic behavior based at least in part on a number of edges between two nodes of the graph of expressions; and performing a moderating action responsive to the likelihood exceeding a threshold likelihood, wherein the moderating action prevents the participant from posting an additional expression.

2. The computer program product of claim 1, wherein the method further comprises:
generating at least one more graph of expressions of at least one more participant;
combining the graphs into a single graph; and
performing a graphical text analysis on the combined graph in order to identify which one or more of the participants have a problematic behavior.

3. The computer program product of claim 1, wherein the performing the graphical text analysis comprises determining a likelihood of the graph to belong to one of a plurality of clusters of previously generated graphs, each cluster representing one or more different problematic behaviors.

4. The computer program product of claim 3, wherein a problematic behavior represented by a cluster previously caused a problem in an online discussion.

5. The computer program product of claim 1, wherein the performing the moderating action comprises sending a message to a human moderator of the discussion in order to cause the human moderator to take an appropriate action to influence a course of the discussion.

6. The computer program product of claim 1, wherein the performing the moderating action comprises sending a message to the participant or limiting the participant's ability to participate in the discussion.

7. The computer program product of claim 1, wherein the online discussion comprises one of a sequence of comments or posted messages in an online bulletin board, a sequence of comments under a post in a social network, a sequence of comments under an online article, a sequence of group emails, a live conversation in an online chat room or in an online video game, and text in systems that allow a participant to upload and download.

8. The computer program product of claim 1, wherein the method further comprises:
combining the graph with another graph for another participant; and
performing a graphical text analysis on the combined graph to increase the likelihood.

9. A computer system for moderating an online discussion between a plurality of participants, the system comprising:
a memory having computer readable instructions; and
a processor configured to execute the computer readable instructions, the instructions comprising:
receiving expressions from a participant during an online discussion;
generating a graph of expressions of the participant, wherein the graph comprises nodes that represent tokens, and edges that represent temporal precedence in the expressions, wherein each node possesses a feature vector, and wherein the feature vector is a direct sum of a syntactic vector, a semantic vector, and a predetermined vector for an identity of the participant;
performing a graphical text analysis on the graph to determine a likelihood of the participant to have a problematic behavior based at least in part on a number of edges between two nodes of the graph of expressions; and
performing a moderating action responsive to the likelihood exceeding a threshold likelihood, wherein the moderating action prevents the participant from posting an additional expression.

10. The system of claim 9, wherein the performing the graphical text analysis comprises determining a likelihood of the graph to belong to one of a plurality of clusters of previously generated graphs, each cluster representing one or more different problematic behaviors.

11. The system of claim 10, wherein a problematic behavior represented by a cluster previously caused a problem in an online discussion.

12. The system of claim 9, wherein the performing the moderating action comprises sending a message to a human moderator of the discussion in order to cause the human moderator to take an appropriate action to influence a course of the discussion.

13. The system of claim 9, wherein the performing the moderating action comprises sending a message to the participant or limiting the participant's ability to participate in the discussion.

14. The system of claim 9, wherein the online discussion comprises one of a sequence of comments or posted messages in an online bulletin board, a sequence of comments under a post in a social network, a sequence of comments under an online article, a sequence of group emails, a live conversation in an online chat room or in an online video game, and text in systems that allow a participant to upload and download.

15. A computer program product, comprising:
a computer readable storage medium having program instructions embodied therewith, the program instructions readable by a processing circuit to cause the processing circuit to perform a method of moderating an online discussion between a plurality of participants, the method comprising:
receiving expressions from a participant during an online discussion;
generating a graph of expressions of the participant, wherein the graph comprises nodes that represent tokens, and edges that represent temporal precedence in the expressions, wherein each node possesses a feature vector, and wherein the feature vector is a direct sum of a syntactic vector, a semantic vector, and a predetermined vector for an identity of the participant;
performing a graphical text analysis on the graph to determine a likelihood of the participant to have a problematic behavior based at least in part on a number of edges between two nodes of the graph of expressions; and
performing a moderating action responsive to the likelihood exceeding a threshold likelihood, wherein the moderating action prevents the participant from posting an additional expression,
wherein performing the graphical text analysis on the graph to determine a likelihood of the participant to have a problematic behavior is further based at least in part on a feature similarity of at least one feature.

16. The computer program product of claim 15, wherein the at least one feature incorporates a syntactic component, a semantic component, and a dynamical component of the expression.

* * * * *